United States Patent
Poe

(10) Patent No.: US 8,474,441 B2
(45) Date of Patent: Jul. 2, 2013

(54) AUTOMOBILE FUEL PRETREATMENT DEVICE

(75) Inventor: Jen-Chun Poe, Taipei (TW)

(73) Assignee: Top 1 Green Development Co., Ltd., Taipei (TW)

( * ) Notice: Subject to any disclaimer, the term of this patent is extended or adjusted under 35 U.S.C. 154(b) by 345 days.

(21) Appl. No.: 12/896,925

(22) Filed: Oct. 4, 2010

(65) Prior Publication Data

US 2011/0079202 A1 Apr. 7, 2011

(30) Foreign Application Priority Data

Oct. 7, 2009 (TW) ................................ 98218444 U

(51) Int. Cl.
*F02G 5/00* (2006.01)
*F02M 27/00* (2006.01)
*F02B 51/00* (2006.01)

(52) U.S. Cl.
USPC ............ 123/549; 123/557; 123/538; 123/536

(58) Field of Classification Search
USPC .......... 123/549, 557, 538, 552, 536; 219/206, 219/275, 301, 375, 505, 530, 541; 261/142; 338/22 R; 138/39, 37, 177; 248/689, 447.2, 248/468, 62, 231.21; 439/506, 728, 759, 439/819
See application file for complete search history.

(56) References Cited

U.S. PATENT DOCUMENTS

| | | | | |
|---|---|---|---|---|
| 4,016,441 A * | 4/1977 | Herr et al. | .......... | 310/13 |
| 4,422,429 A * | 12/1983 | Reed | .............. | 123/557 |
| 4,543,474 A * | 9/1985 | Horsma et al. | ................ | 219/553 |
| 4,814,584 A * | 3/1989 | Bohlender et al. | ............ | 219/535 |
| 5,257,609 A * | 11/1993 | Reed et al. | ..................... | 123/557 |
| 5,690,079 A * | 11/1997 | Craig | ............................. | 123/538 |
| 5,918,636 A * | 7/1999 | Mitchell et al. | ................. | 138/39 |
| 6,178,954 B1 * | 1/2001 | Kim | ................................ | 123/538 |
| 6,958,463 B1 * | 10/2005 | Kochman et al. | ............. | 219/544 |
| 2003/0188726 A1 * | 10/2003 | Watanabe et al. | ............. | 123/557 |

* cited by examiner

*Primary Examiner* — Thanh Truong
*Assistant Examiner* — Omar Morales
(74) *Attorney, Agent, or Firm* — Leong C. Lei

(57) ABSTRACT

An automobile fuel pretreatment device includes an instantaneous constant-temperature heating device including a fuel tube which allows fuel to flow, a heating unit positioned on and heating an outside surface of the fuel tube, and two spring clamp boards enclosing and clamping the heating unit on the fuel tube. Each of the spring clamp boards has a locking hole formed adjacent to a first free end and a locking tab formed adjacent to a second free end. The locking tab of each of the spring clamp boards is received through the locking hole of the other one of the spring clamp boards to engage the first free end of the other one of the spring clamp boards. A magnetization combustion-enhancing device includes two permanent magnets located adjacent to the fuel tube to induce magnetization on the fuel flowing through the fuel tube.

24 Claims, 13 Drawing Sheets

AUTOMOBILE FUEL PRETREATMENT DEVICE

(a) TECHNICAL FIELD OF THE INVENTION

The present invention generally relates to an automobile fuel pretreatment device, and more particularly to an automobile fuel pretreatment device that effects continuous instantaneous complete combustion of fuel, such as gasoline and diesel.

(b) DESCRIPTION OF THE PRIOR ART

FIGS. 1 and 2 of the attached drawings show a high performance device for automobile fuel system disclosed in Taiwan Patent Publication No. 179347 (Application No. 80200363), which comprises an instantaneous constant-temperature heating device 1 and a magnetization combustion-enhancing device 2 mounted on the instantaneous constant-temperature heating device 1. The instantaneous constant-temperature heating device 1 comprises a heating zone 11 having a top surface 111 on which two plate electrodes 12 and an electric thermal ceramic element 13 interposed between the two plate electrodes 12 are positioned. Two conductor wires 14 respectively supply electrical power to the two plate electrodes 12 for heating the electric thermal ceramic element 13, whereby the thermal energy generated by the electric thermal ceramic element 13 is transmitted to the heating zone 11. The plate electrodes 12 and the electric thermal ceramic element 13 are retained on the heating zone 11 by a clamp 15, which has a rectangular cross-section and is fit over an outer circumference of the heating zone 11. The clamp 15 has a top wall 151 positioned on the top surface of plate electrodes 12 and a bottom wall 152 forming a plurality of threaded holes 153 that receives bolts 16, whereby through clockwise rotation of the bolts 16, the bolts are caused to project beyond the bottom wall 152 and engage a bottom surface 112 of the heating zone 11. Thus, the plate electrodes 12 and the electric thermal ceramic element 13 are securely held between the top wall 151 of the clamp 15 and the heating zone 11 110.

However, the instantaneous constant-temperature heating device 1 is often switched between heating condition and cooling condition, leading to frequent thermal expansion and cooling shrinkage of the heating zone 11, the plate electrodes 12, and the electric thermal ceramic element 13. Applying bolts 16 to tightly engage the bottom surface 112 of the heating zone during the assembling process is not enough to consistently and tightly position the plate electrodes 12 and the electric thermal ceramic element 13 against the top surface of the heating zone 11 with the bolts 16 and the clamp 15 under the condition of thermal expansion and cooling shrinkage. Thus, when these components are heated and thus expand, the bottom surface 112 of the heating zone 11 is depressed by the bolts 16 to get inward recessed. When these components are cooled and thus shrink, the bolts 16 and the clamp 15 are no longer securely hold these components, leading to loosening of the clamp 15. Apparently, using bolts 16 to effect secure clamping is not an acceptable solution for long term operation.

Further, when an automobile is at low speed operation, fuel consumption is reduced, and when the automobile is at high speed operation, fuel consumption is increased. Thus, in high speed operation, using a single electric thermal ceramic element 13 to supply thermal energy for heating the heating zone 11 will result in insufficiency of thermal energy and thus cause a poor result of heating. Further, the heating zone 11 and the fuel tubes 17 together form an arrangement of dual Z-shaped path as shown in FIG. 3, the flow path that fuel must pass is extended, leading to an increased period of time for complete heating of the fuel, so that the efficiency of use is poor.

As shown in FIGS. 1 and 4, the magnetization combustion-enhancing device 2 comprises a C-shaped clamping sleeve 21. The C-shaped clamping sleeve 21 has opposite inside surfaces on which two permanent magnets 22 are respectively mounted. The two permanent magnets 22 that are located on the opposite sides clamp outside surfaces of the fuel tube 17. However, such a C-shaped clamping sleeve 21 allows easy leakage of lines of magnetic force through an opening 211 thereof, leading to a shortened time of use of the lines of magnetic force induced by the permanent magnets 22.

SUMMARY OF THE INVENTION

An objective of the present invention is to provide an automobile fuel pretreatment device, which comprises spring clamp boards that securely and tightly clamp and fix an insulation assembly formed of an insulation sheet wrapping around plate electrodes and an electric thermal ceramic element on a fuel tube, even under the condition of thermal expansion and cooling shrinkage.

Another objective of the present invention is to provide an automobile fuel pretreatment device, which comprises a plurality of electric thermal ceramic elements for heating a fuel tube so that excellent heating can be accomplished regardless of the amount of fuel supplied.

A further objective of the present invention is to provide an automobile fuel pretreatment device, which comprises a fuel tube that is uniquely arranged in a single Z-shaped path to shorten the flow path for fuel and to maintain stable flow rate of fuel.

Yet a further objective of the present invention is to provide an automobile fuel pretreatment device, which comprises a magnetization combustion-enhancing device comprising first-layer clips arranged in a circumferentially enclosing configuration to prevent line of magnetic force induced by permanent magnets from easy leakage and thus extending the time of use of the magnetic force.

The objectives of the present invention and dissolution of the drawbacks of the conventional technology are achieved through the following technical solution, wherein an automobile fuel pretreatment device constructed in accordance with the present invention comprises an instantaneous constant-temperature heating device and a magnetization combustion-enhancing device.

The instantaneous constant-temperature heating device comprises a fuel tube which allows fuel to flow therethrough, a heating unit, and a spring clamp board. The heating unit comprises at least two plate electrodes positioned on an outside surface of the fuel tube, at least one electric thermal ceramic element interposed between the two plate electrodes, at least one insulation sheet wrapping around the two plate electrodes and the electric thermal ceramic element, and two power cables respectively supplying electrical current to the two plate electrodes. The two plate electrodes transmit the electrical current to the electric thermal ceramic element for heating the fuel tube. The spring clamp board encloses and clamps an insulation assembly formed of the insulation sheet wrapping around the two plate electrodes and the electric thermal ceramic element on the fuel tube. The spring clamp board comprises a locking hole formed adjacent to a first free end and a locking tab formed adjacent to a second free end. The locking tab is received through the locking hole to engage the first free end. The magnetization combustion-enhancing"

device comprises at least one permanent magnet that is located adjacent to an outside surface of the fuel tube to induce magnetization on the fuel flowing through the fuel tube.

In the automobile fuel pretreatment device described above, the first free end of the spring clamp board is inclined, whereby when the spring clamp board bulges outward, the first free end applies a first force component and a second force component to the locking tab to deform the locking tab so as to provide a clearance space for accommodating thermal expansion.

The heating unit comprises a plurality of pairs of plate electrodes arranged on the outside surface of the fuel tube, a plurality of electric thermal ceramic elements, and a plurality of insulation sheets. Each of the electric thermal ceramic elements is interposed between plate electrodes of each of the plate electrode pairs. The two power cables supply electrical current to each of the plate electrode pairs. Each of the insulation sheets wraps around each of the plate electrode pairs and each of the electric thermal ceramic elements. The spring clamp board encloses and clamps the plate electrode pairs and the electric thermal ceramic elements that are wrapped by the insulation sheets on the fuel tube. Thus, excellent heating can be realized with the electric thermal ceramic elements regardless the amount of fuel supplied to the fuel tube.

The fuel tube comprises a rectangular tubular body and two circular tubular sections extending into and communicating the rectangular tubular body. The pairs of plate electrodes are respectively positioned on outside surfaces of the rectangular tubular body. The rectangular tubular body and the circular tubular sections collectively form a single Z-shaped path. Thus, the flow path of fuel can be shortened.

The magnetization combustion-enhancing device comprises two first-layer clips that are jointed to each other to circumferentially enclose an outside circumference of the rectangular tubular body and two permanent magnets, which are retained through magnetic attraction on inside surfaces of the two first-layer clips at locations adjacent to the outside surfaces of the rectangular tubular body. The two first-layer clips are of a U-shape and have openings facing each other. The two permanent magnets are retained through magnetic attraction on jointing interfaces between the two first-layer clips. Spaced positioning bumps are formed on the inside surfaces of each of the first-layer clips for engaging and supporting the permanent magnets. Thus, the lines of magnetic force of the permanent magnets are conducted to flow within and along the two first-layer clips without easy leakage and the time of use of the magnetic force can be extended.

In an alternative embodiment, the magnetization combustion-enhancing device further comprises two receptacles having a bowl-shape and forming openings facing each other for receiving and holding the two permanent magnets therein. Spaced positioning bumps are formed on inside surfaces of each of the first-layer clips for engaging and supporting the receptacles. The two permanent magnets are retained through magnetic attraction on the jointing interfaces between the two first-layer clips with the two receptacles. The magnetization combustion-enhancing device further comprises two second-layer clips positioned against inside surfaces of the two first-layer clips. The two second-layer clips are of a U-shape and engaging outside surfaces of the two receptacles. Thus, the path through which the lines of magnetic force of the permanent magnet flow can be expanded to allow the lines of magnetic force to fast flow through the first-layer and second-layer clips.

In another aspect of the present invention, an automobile fuel pretreatment device comprises an instantaneous constant-temperature heating device and a magnetization combustion-enhancing device. The instantaneous constant-temperature heating device comprises a fuel tube which allows fuel to flow therethrough, a heating unit, and two spring clamp boards. The heating unit comprises at least two plate electrodes positioned on an outside surface of the fuel tube, at least one electric thermal ceramic element interposed between the two plate electrodes, at least one insulation sheet wrapping around the two plate electrodes and the electric thermal ceramic element, and two power cables respectively supplying electrical current to the two plate electrodes. The two plate electrodes transmit the electrical current to the electric thermal ceramic element for heating the fuel tube. The two spring clamp boards enclose and clamp an insulation assembly formed of the insulation sheet wrapping around the two plate electrodes and the electric thermal ceramic element on the fuel tube. Each of the spring clamp boards comprises a locking hole formed adjacent to a first free end and a locking tab formed adjacent to a second free end. The locking tab of each of the spring clamp boards is received through the locking hole of the other one of the spring clamp boards to engage the first free end of the other one of the spring clamp boards. The magnetization combustion-enhancing device comprises at least one permanent magnet that is located adjacent to an outside surface of the fuel tube to induce magnetization on the fuel flowing through the fuel tube.

With the above described technical solution, the automobile fuel pretreatment device constructed in accordance with the present invention has the following efficacies. The arrangement of the spring clamp boards helps securely and tightly clamping and fixing the insulation assemblies formed of the insulation sheets wrapping the plate electrodes and the electric thermal ceramic elements on the outside surfaces of the rectangular tubular body of the fuel tube, even under thermal expansion and cooling shrinkage. The arrangement of a plurality of electric thermal ceramic elements to heat the rectangular tubular body of the fuel tube help accomplishing excellent heating, regardless of the amount of fuel supplied, to efficiently heat the fuel to a desired temperature. The fuel tube is arranged to form a single Z-shaped path so as to shorten the flow path of fuel and improve the efficiency of use. Further, the magnetization combustion-enhancing device comprises two first-layer clips that are attractively held together by the permanent magnets to form a circumferentially enclosing configuration so that the lines of magnetic force of the permanent magnets are conduced to flow within and along the first-layer clips without easy leakage and the time of use of the magnetic force is extended.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
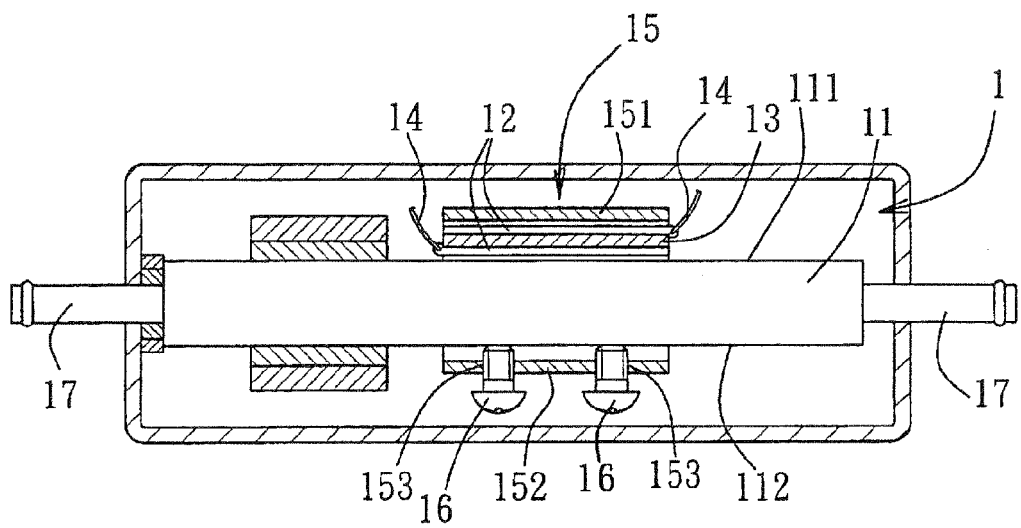
FIG. 1 is a cross-sectional view showing a known device disclosed in Taiwan Patent Publication No. 179347.
Figure 2:
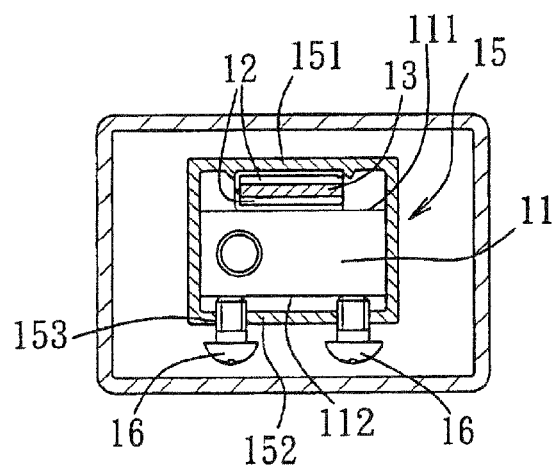
FIG. 2 is another cross-sectional view showing the known device disclosed in Taiwan Patent Publication No. 179347.
Figure 3:
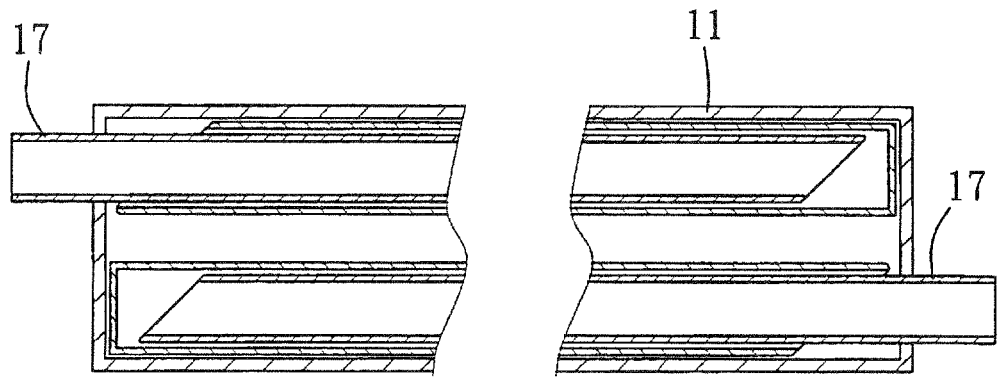
FIG. 3 is a cross-sectional view showing a heating zone and a fuel tube of the device disclosed in Taiwan Patent Publication No. 179347.
Figure 4:
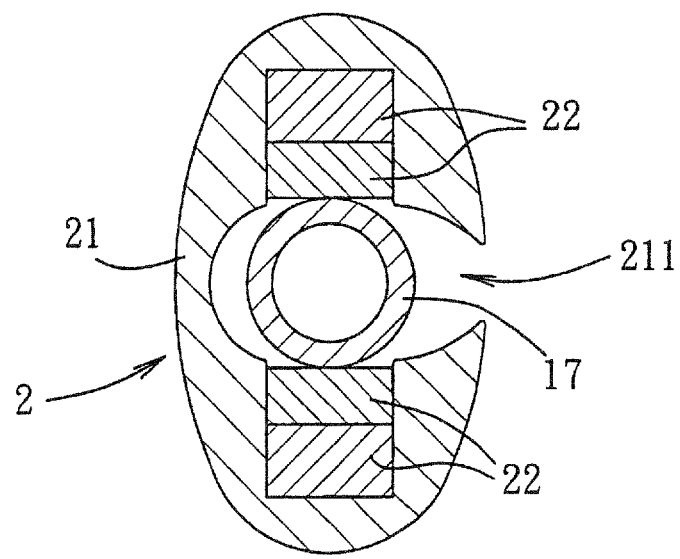
FIG. 4 is a cross-sectional view showing a magnetization combustion-enhancing device of the device disclosed in Taiwan Patent Publication No. 179347 mounted on the fuel tube.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

It is first noted in the following description, similar parts/components are designated with the same reference numerals as indicted in the drawings attached herewith.

Figure 5:
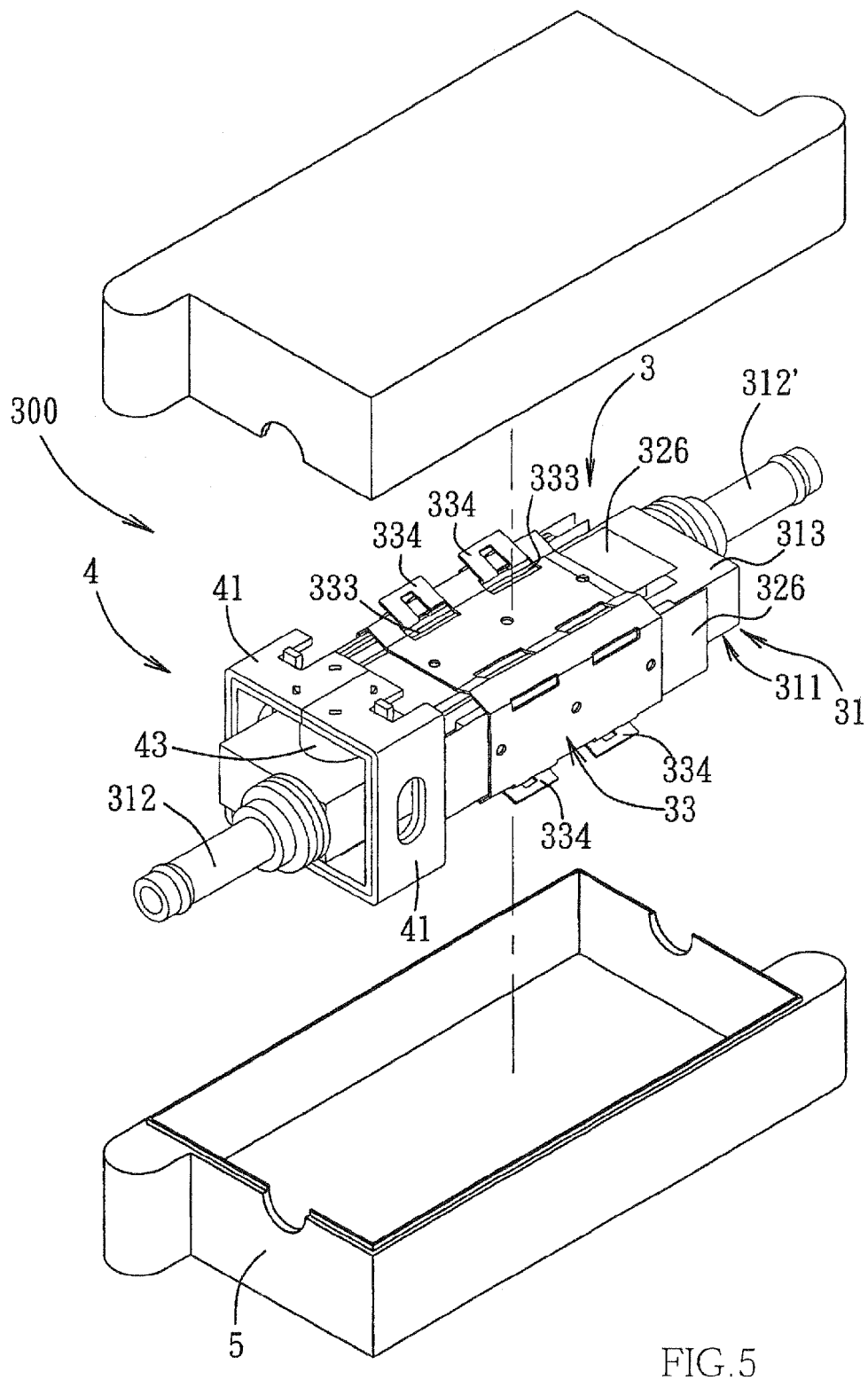
FIG. 5 is a perspective view showing an automobile fuel pretreatment device according to a first preferred embodiment of the present invention, illustrating the automobile fuel pretreatment device is mounted inside an enclosure.

As shown in FIG. 5, an automobile fuel pretreatment device according to a first preferred embodiment of the present invention is illustrated. The automobile fuel pretreatment device, generally designated at 300, is applicable to a gasoline carburetor based engine fuel system (not shown) by being arranged behind a gasoline filter and a gasoline pump and connected between the gasoline pump and a carburetor. When the automobile engine is started, the automobile fuel pretreatment device 300 shows the characteristics of helping realizing continuous and complete combustion of fuel in an instantaneous fashion, wherein through conversion of cold fuel combustion rate of cold fuel into explosive combustion rate of hot fuel in a unit time, the incompletely-combusted fuel-air mixture, which is of high pollution and was conventionally subjected to secondary, cleaning-purpose combustion in a catalytic converter, is now completely combusted just through the primary, in-cylinder combustion. Consequently, output horsepower is enhanced and an engine behavior of low rotational speed and high torque, similar to that of a diesel engine, can be realized. Apparently, for practical applications, the automobile fuel pretreatment device 300 is also applicable to fuel injection engine fuel system or diesel engine fuel system.

Figure 6:
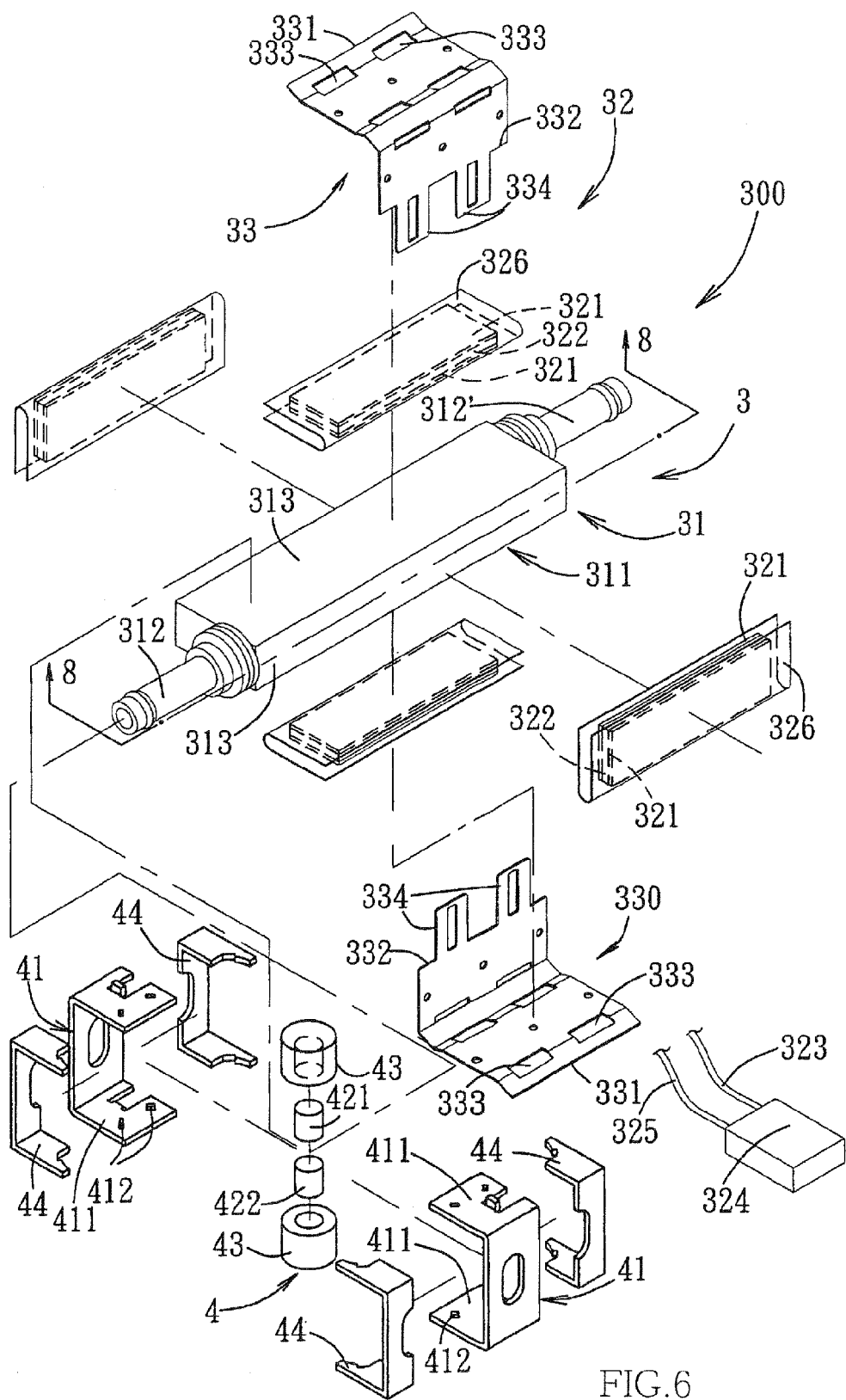
FIG. 6 is an exploded view of the automobile fuel pretreatment device according to the first preferred embodiment of the present invention, illustrating spatial relationship between an instantaneous constant-temperature heating device and a magnetization combustion-enhancing device and structural arrangements thereof.
Figure 7:
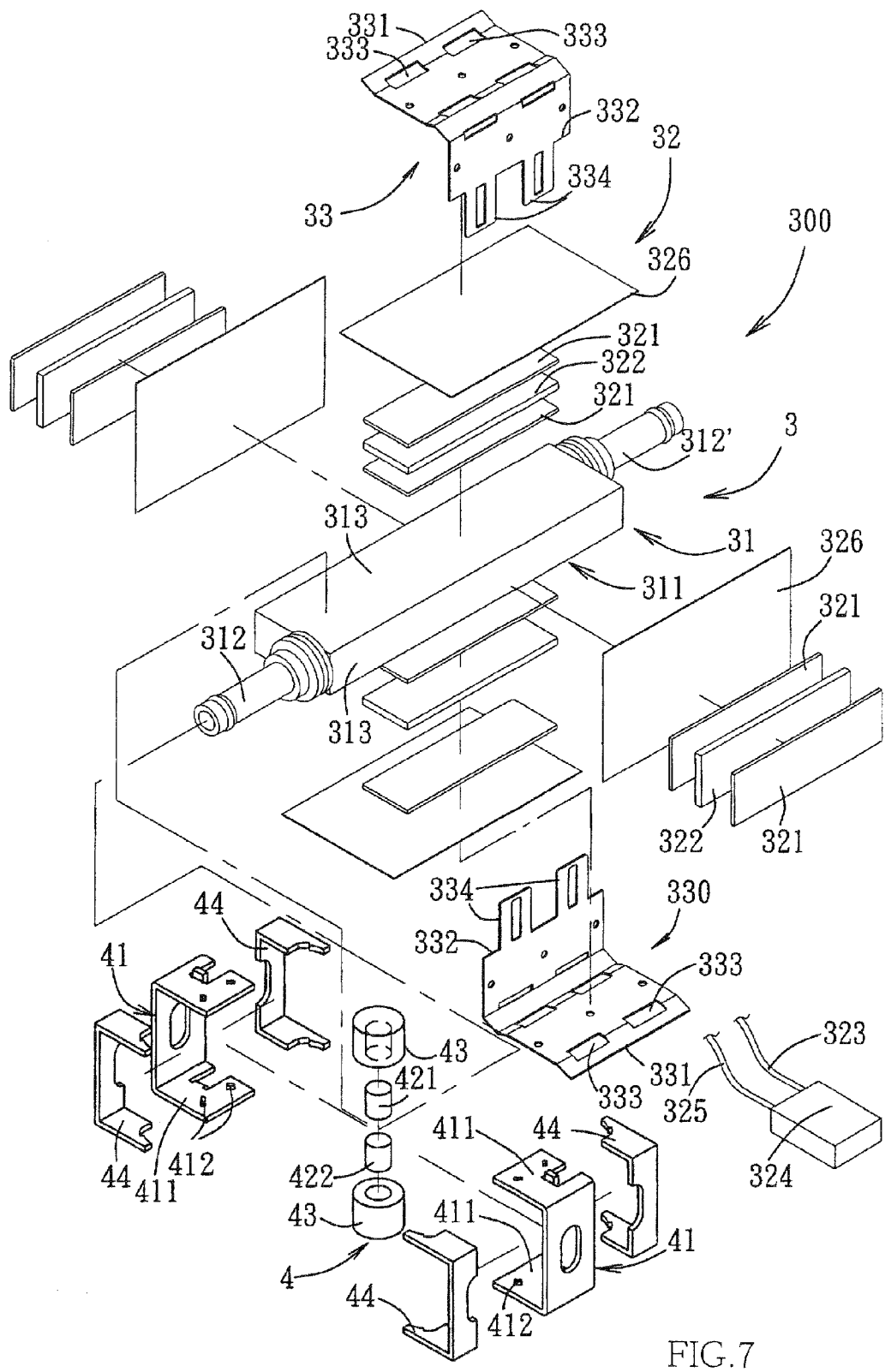
FIG. 7 is an exploded view of the automobile fuel pretreatment device according to the first preferred embodiment of the present invention, illustrating spatial relationship between an instantaneous constant-temperature heating device and a magnetization combustion-enhancing device and structural arrangements thereof.
Figure 8:
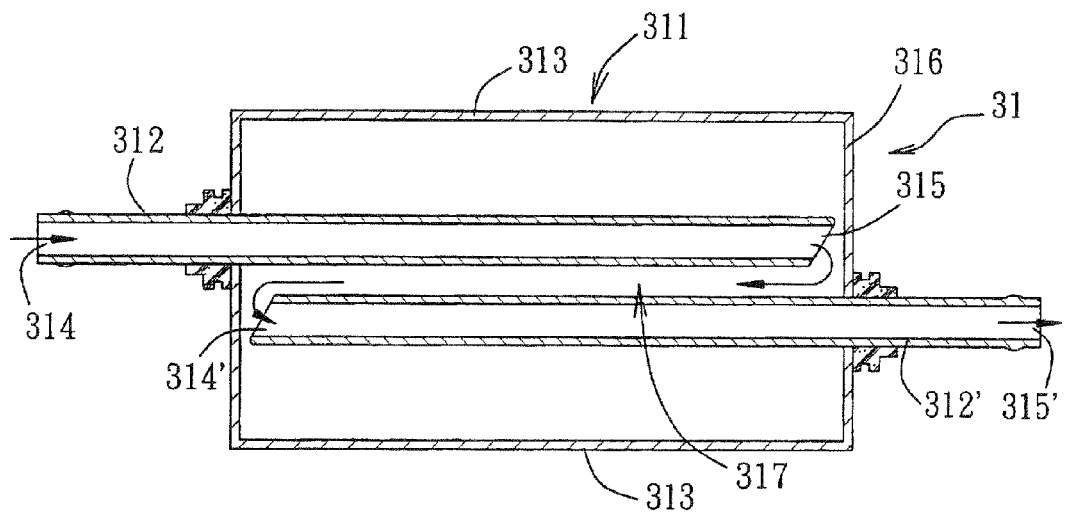
FIG. 8 is a cross-sectional view taken along line 8-8 of FIG. 6, illustrating a rectangular tubular body and circular tubular sections of the fuel tube collectively forming a single Z-shaped path and a flowing path of fuel.

As shown in FIGS. 6, 7, and 8, the automobile fuel pretreatment device 300 comprises an instantaneous constant-temperature heating device 3, and a magnetization combustion-enhancing device 4 that is mounted to the instantaneous constant-temperature heating device 3 and arranged to be substantially parallel thereto. The instantaneous constant-temperature heating device 3 comprises a fuel tube 31 connected between the gasoline pump and the carburetor to allow fuel to flow therethrough. The fuel tube 31 is made of for example red brass, which is of excellent thermal conductivity and shows a safety nature of generating no spark when impacted by fuel, and comprises a rectangular tubular body 311 and two circular tubular sections 312, 312' extending into and communicating the rectangular tubular body 311. The two circular tubular sections 312, 312' respectively project beyond front and rear sides of the rectangular tubular body 311 in order to respectively connect to the gasoline pump and the carburetor for conducting the fuel supplied from the gasoline pump through the fuel tube 31 to the carburetor.

The instantaneous constant-temperature heating device 3 further comprises a heating unit 32 for heating the rectangular tubular body 311 of the fuel tube 31. The heating unit 32 comprises a plurality of pairs of plate electrodes 321 and a plurality of electric thermal ceramic elements 322. Each pair of plate electrodes 321 is positioned on each outside surface 313 of the rectangular tubular body 311 and each electric thermal ceramic element 322 is interposed between each pair of plate electrodes 321. The heating unit 32 has a positive electrode power cable 323 that is connected between one of the plate electrodes 321 of each pair and a power supply unit 324 for conducting positive electrode current and a negative electrode power cable 325 connected between another one of the plate electrodes 321 of each pair and the power supply unit 324 for conducting negative electrode current. As such, the power cables 323, 325 transmit electrical current supplied from the power supply unit 324 to each pair of plate electrodes 321, whereby each pair of plate electrodes 321 transmits the electrical current to the electric thermal ceramic element 322 interposed therebetween in order to make the electric thermal ceramic element 322 heating the rectangular tubular body 311 of the fuel tube 31 and thus converting the cold fuel supplied from the gasoline pump, through heating applied by the fuel tube 31, into an ionized condition and completely and uniformly heated fuel to be further supplied to the carburetor.

When an automobile is operating at a high speed, the amount of fuel flowing through the fuel tube 31 is increased. Through the arrangement of multiple sets of electric thermal ceramic element 322 to simultaneously heat the rectangular tubular body 311, the fuel flowing through the fuel tube 31 can be instantaneously heated to a predetermined high temperature, which shortens the time period required for heating and improves the temperature and efficiency realized for the heating operation, whereby the fuel flowing through the fuel tube 31 can be completely heated to realize uniform result of heating. Further, due to the natural characteristics of the electric thermal ceramic element 322, when the automobile switches from high speed operation to low speed operation and the fuel is over-heated to an excessively high temperature beyond a predetermined limit, the electrical resistance of the electric thermal ceramic element 322 becomes infinitely increased, reducing the electrical current flowing into the electric thermal ceramic element 322 so as to stop the heating operation; when the fuel temperature drops to a temperature lower than a predetermined limit, the electrical resistance of the electric thermal ceramic element 322 automatically lowers to allow an increase of electrical current for subsequently performing heating operation to thereby realize an operation of constant temperature heating.

Preferably, the heating unit 32 according to the instant embodiment further comprises a plurality of insulation sheets 326. Each insulation sheet 326 wraps around each pair of plate electrodes 321 and the electric thermal ceramic element 322 interposed therebetween in such a way that a portion of the insulation sheet 326 is located between one of the plate electrodes 321 and the respective outside surface 313 of the rectangular tubular body 311, while another portion of the insulation sheet covers an outside surface of another one of the plate electrodes 321. As such, conduction of electrical current from the plate electrodes 321 to the rectangular tubular body 311 is prevented. This prevents direct contact with the plate electrodes 321 and also prevents the plate electrodes 321 from directly transmitting electrical current to two spring clamp boards 33, 330 of the instantaneous constant-temperature heating device 3, so as to help improving operation safety of the automobile fuel pretreatment device 300.

Figure 9:
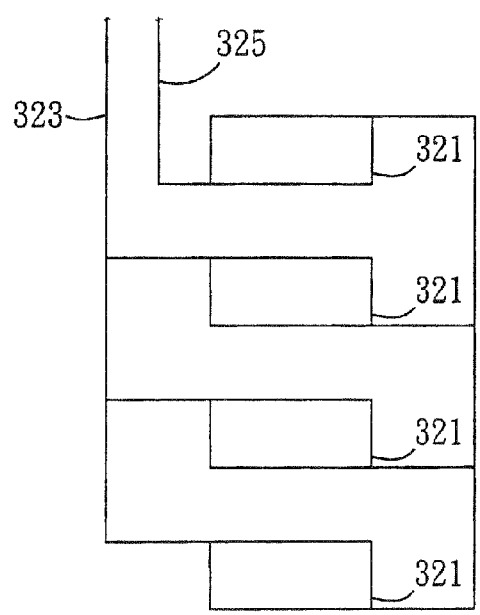
FIG. 9 is a schematic view of the automobile fuel pretreatment device according to the first preferred embodiment of the present invention, illustrating connection between power cables and plate electrodes of the automobile fuel pretreatment device when applied to a gasoline carburetor engine fuel system.
Figure 10:
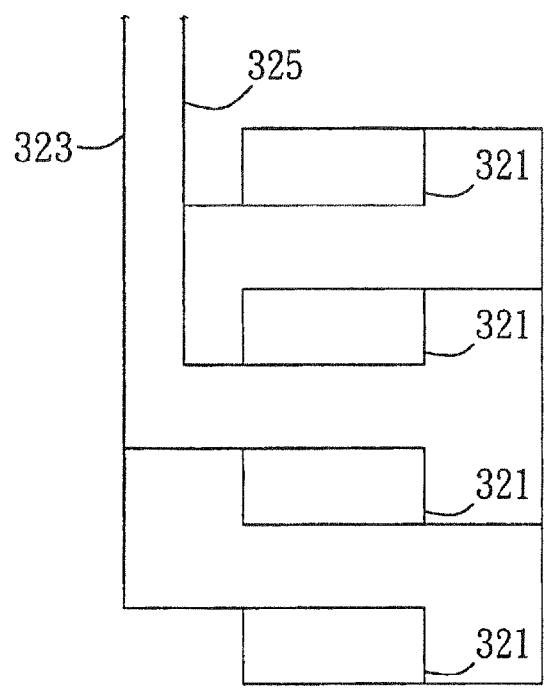
FIG. 10 is a schematic view of the automobile fuel pretreatment device according to the first preferred embodiment of the present invention, illustrating connection between power cables and plate electrodes of the automobile fuel pretreatment device when applied to a gasoline injection engine fuel system.
Figure 11:
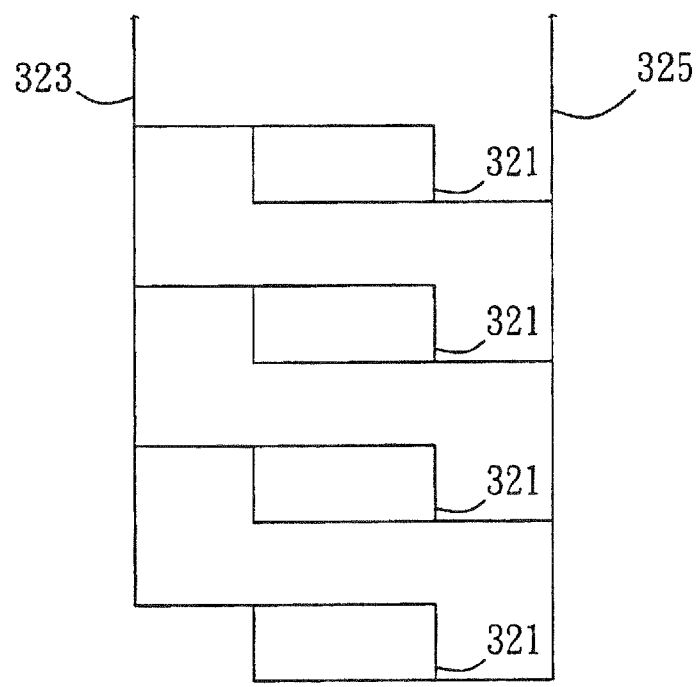
FIG. 11 is a schematic view of the automobile fuel pretreatment device according to the first preferred embodiment of the present invention, illustrating connection between power cables and plate electrodes of the automobile fuel pretreatment device when applied to a diesel engine fuel system.

In the instant embodiment, the number of the electric thermal ceramic element 322 is four, which is taken as an example for explanation. An example of explaining plate electrodes 321 is also given for four pairs of plate electrodes. The four pairs of plate electrodes 321 are connected to the two power cables 323, 325 according to the example arrangement illustrated in FIG. 9, in which three of the four pairs of plate electrodes 321 are connected in parallel to each other and then connected in series with the remaining one of the four pairs of plate electrodes 321. As such, electrical power can be supplied to the electric thermal ceramic element 322 for heating the rectangular tubular body 311 to a predetermined level of temperature. It is apparent that the numbers of the electric thermal ceramic element 322 and the plate electrodes 321 can be increased or decreased as desired and they are not limited to four pairs of plate electrodes 321 and four electric thermal ceramic elements 322 as illustrated in the instant embodiment. Further, the predetermined level of temperature can be set according to the applications thereof. For example, when the automobile fuel pretreatment device 300 is applied to a gasoline injection engine fuel system or a diesel engine fuel system, the predetermined level of temperature for heating would be different from that of the gasoline carburetor engine fuel system. When the automobile fuel pretreatment device 300 is applied to the gasoline injection engine fuel system, the four pairs of plate electrodes 321 are arranged as shown in FIG. 10 that two of the four pairs of plate electrodes 321 are connected in parallel first and then further connected in series to the remaining two of the four pairs of plate electrodes 321 that are in parallel connection. When the automobile fuel pretreatment device 300 is applied to a diesel engine fuel system, the four pairs of plate electrodes 321 are all connected in parallel as shown in FIG. 11. With the plate electrodes 321 connected in different ways for supplying electrical power to the electric thermal ceramic elements 322, proper level of predetermined temperature can be realized for different types of fuel.

As shown in FIGS. 6, 7, and 8, to position and retain each pair of plate electrodes 321 and the electric thermal ceramic element 322 interposed therebetween, as well as the insulation sheet 326 wrapping around the plate electrodes, on the rectangular tubular body 311, the instantaneous constant-temperature heating device 3 comprises two spring clamp boards 33, 330. The two spring clamp boards 33, 330 are of identical structure and material, so that only the spring clamp board 33 will be described herein, but the description is certainly applicable to the spring clamp board 330. The spring clamp board 33 is made of a metallic material and is of an L-shape. In the instant embodiment, the spring clamp board 33 is made of steel and has an inclined first free end 331, a second free end 332, two locking holes 333 adjacent to the first free end 331, and two locking tabs 334 projecting from the second free end 332.

Figure 12:
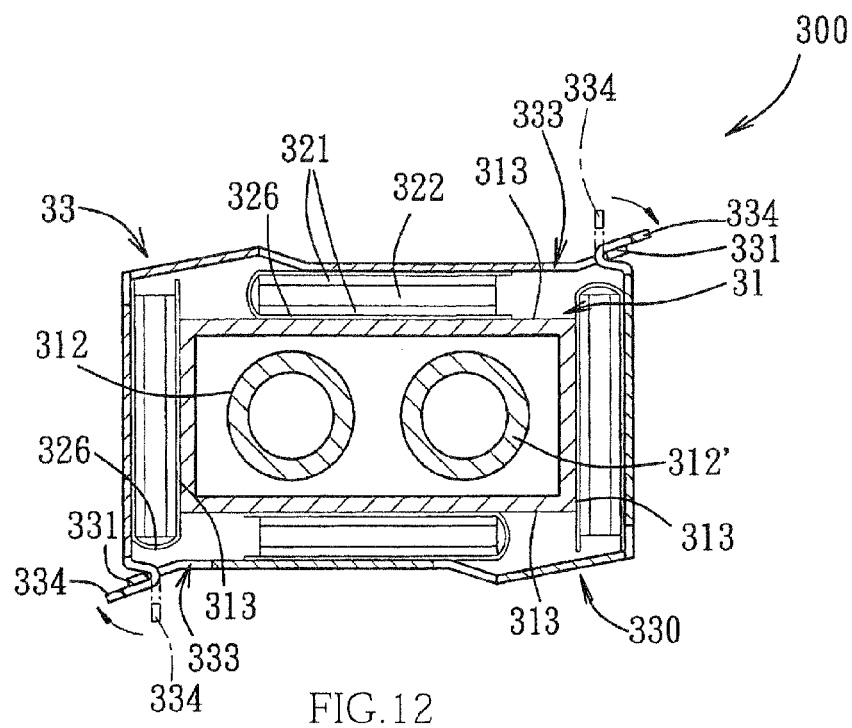
FIG. 12 is a cross-sectional view of the automobile fuel pretreatment device according to the first preferred embodiment of the present invention, illustrating two spring clamp boards enclosing and tightly clamping pairs of plate electrodes and electric thermal ceramic elements respectively wrapped by insulation sheets and positioned on the rectangular tubular body.

To assemble the two spring clamp boards 33, 330 to clamp and enclose each pair of plate electrodes 321, the electric thermal ceramic element 322, and the insulation sheet 326, the locking tabs 334 of one of the spring clamp boards, such as the spring clamp board 33, are put into the locking holes 333 formed in the other one of the spring clamp boards, such as the spring clamp board 330, and at the same time, the locking tabs 334 of said other one of the spring clamp boards, namely the spring clamp board 330, are put into the locking holes 333 of said one of the spring clamp boards, namely the spring clamp board 33. With the two spring clamp boards 33, 330 being tightly held against the insulation sheets 326, the locking tabs 334 are folded as indicated by the arrows of FIG. 12 so as to bend outward and engage the first free ends 331. This completes the assembling of the two spring clamp boards 33, 330 so that the two spring clamp boards 33, 330 enclose and tightly clamp the pairs of plate electrodes 321, the electric thermal ceramic elements 322, and the insulation sheets 326 on the rectangular tubular body 311 thereby properly positioning the plate electrodes 321, the electric thermal ceramic elements 322, and the insulation sheets 326 on the rectangular tubular body 311 without undesired shifting and shaking. Apparently, it is also feasible to change the numbers of the locking holes 333 and the locking tabs 334 that are formed on each spring clamp board 33, 330 to be one or more than two and this provides the same effect of clamping even under the condition of thermal expansion of the fuel tube 31.

Figure 13:
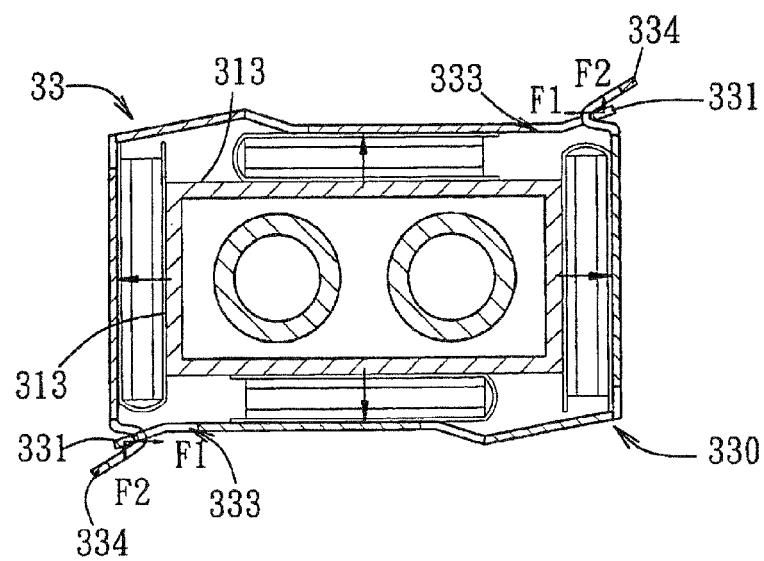
FIG. 13 is a cross-sectional view of the automobile fuel pretreatment device according to the first preferred embodiment of the present invention, illustrating the rectangular tubular body, the pairs of plate electrodes, and the electric thermal ceramic elements bulging the two spring clamp boards outward, when heated and thus expanded, and indicating directions of forces acting thereon.
Figure 14:
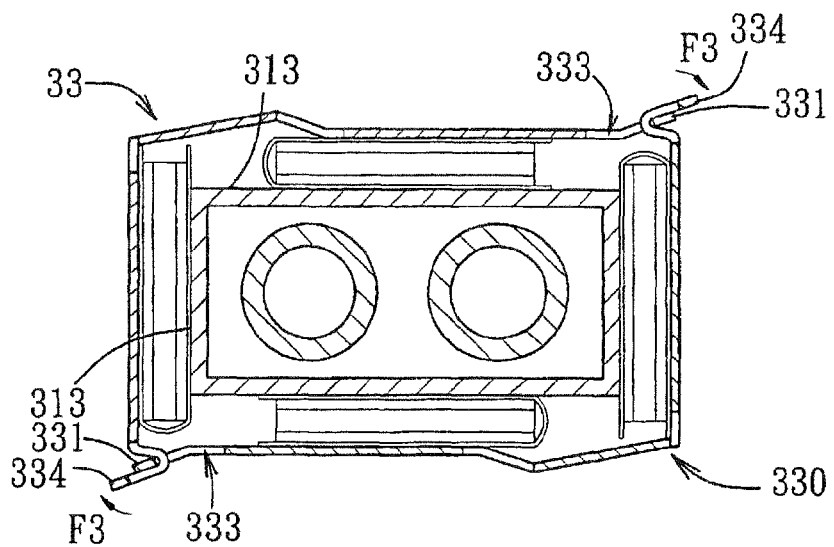
FIG. 14 is a cross-sectional view of the automobile fuel pretreatment device according to the first preferred embodiment of the present invention, illustrating the rectangular tubular body, the pairs of plate electrodes, and the electric thermal ceramic elements being cooled down and inward shrunk to allow the two spring clamp boards to inward retract.

As shown in FIGS. 12 and 13, following the starting and shut-down of the automobile, the instantaneous constant-temperature heating device 3 switches between a heating condition and a cooling condition, and this induces thermal expansion and cold shrinkage on the fuel tube 31, the plate electrodes 321, and the electric thermal ceramic elements 322. The components/parts enclosed and clamped by the two spring clamp boards 33, 330, when expanding, intend to bulge the two spring clamp boards 33, 330 outwards. The inclined arrangement of the first free ends 331 of the two spring clamp boards 33, 330 allows each of the first free ends 331 to apply a first force component F1 and a second force component F2 that is normal to the first force component F1 to each locking tab 334. Consequently, the locking tab 334 is deformed and bent (see FIG. 13), allowing the two spring clamp boards 33, 330 to be slightly bulging for providing a clearance space for accommodating the expansion of those components/parts. As shown in FIGS. 13 and 14, when the components/parts that are enclosed and clamped by the spring clamp boards 33, 330 are under a cold shrinkage condition, each of the locking tabs 334 applies a returning force F3 to the first free end 331 so as to cause inward retraction of the two spring clamp boards 33, 330 for tightly holding the insulation sheets 326, the plate electrodes 321, and the electric thermal ceramic elements 322 on the outside surfaces 313 of the rectangular tubular body 311.

Figure 15:
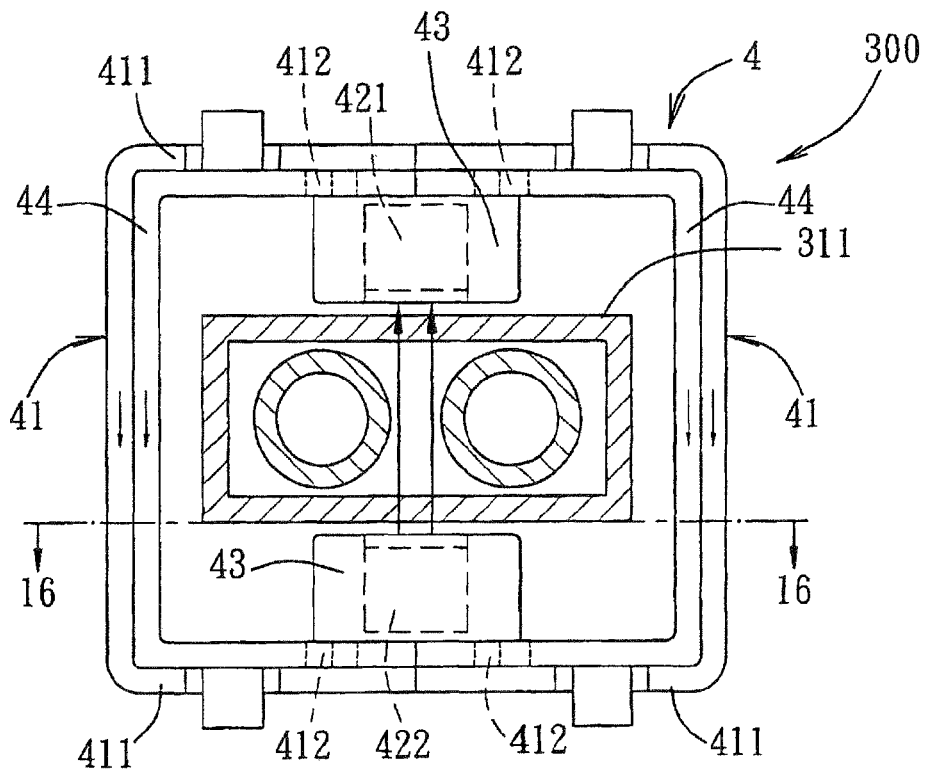
FIG. 15 is a cross-sectional view of the automobile fuel pretreatment device according to the first preferred embodiment of the present invention, illustrating permanent magnets of the magnetization combustion-enhancing device received and held in receptacles and retained through magnetic attraction on first-layer and second-layer clips at locations adjacent to outside surfaces of the rectangular tubular body.
Figure 16:
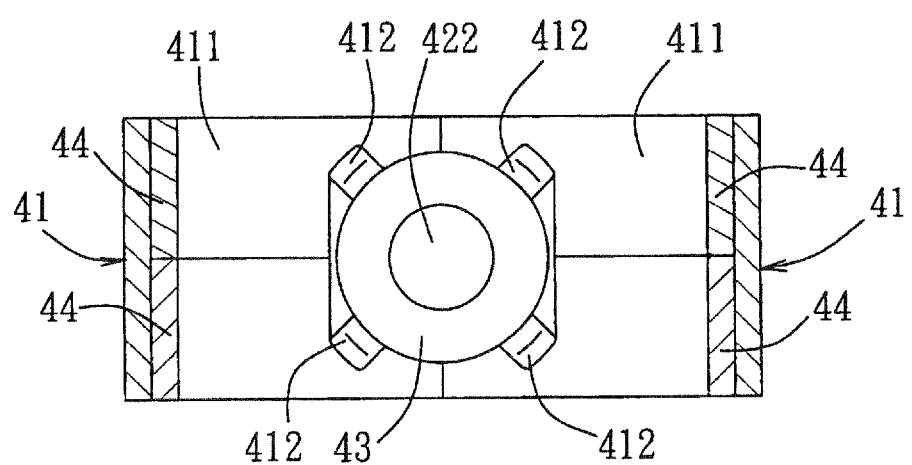
FIG. 16 is a cross-sectional view taken along line 16-16 of FIG. 15, illustrating the permanent magnets retained through magnetic attraction on a jointing interface between two first-layer clips and two pairs of second-layer clips being set on opposite sides of the receptacles.

As shown in FIGS. 7, 15, and 16, the magnetization combustion-enhancing device 4 comprises two U-shaped first-layer clips 41 having openings facing each other and two permanent magnets 421, 422. The two first-layer clips 41 are jointed to each other to form a circumferentially enclosing configuration, which positions the two permanent magnets 421, 422 at opposite upper and lower sides, whereby lines of magnetic force of the permanent magnets 421, 422 are conducted to flow within the two first-layer clips 41 without easy leakage. Preferably, the magnetization combustion-enhancing device 4 further comprises two bowl-shaped receptacles 43 for respectively receiving and retaining the permanent magnets 421, 422. The two first-layer clips 41 engage and hold the two receptacles 43 at the opposite upper and lower sides. Through the bowl-shaped receptacles 43 having openings facing each other, the lines of magnetic force of the permanent magnets 421, 422 are strengthened and direct leakage is prevented, these helping preventing deterioration of the lines of magnetic force of the permanent magnets 421, 422. Since the two first-layer clips 41 are of identical structure and material, the following description is made only with respect to one first-layer clip 41 but is apparently applicable to the other first-layer clip 41. The first-layer clip 41 is made of a metallic material and is set around an outer circumference of the rectangular tubular body 311 and retained inside an enclosure 5 (see FIG. 5). In the instant embodiment, the first-layer clips 41 are made of a soft iron material. Each first-layer clip 41 has two opposing side walls 411, each having an inside surface forming two raised positioning bumps 412, which are spaced from each other and function to engage and retain the respective one of the receptacles 43. Each receptacle 43 has a half portion projecting beyond an opening of the first-layer clip 41 defined between the free ends of the side walls. As such, the receptacle 43 is engageable with and positionable between the positioning bumps 412 of the two first-layer clips 41 so as to constrain each of the receptacles 43 at a location corresponding to a jointing interface between the two first-layer clips 41, whereby the two permanent magnets 421, 422 held in the receptacles 43 are respectively located at the opposite upper and lower sides and correspond in position to each other and with the magnetic attraction induced by the permanent magnets 421, 422, the two first-layer clips 41 are attractively held together.

To improve the path along which the lines of magnetic force of the permanent magnets 421, 422 flow, in the instant embodiment, the magnetization combustion-enhancing device 4 is arranged to further comprise two pairs of second-layer clips 44 for being respectively set on opposite sides of the receptacles 43. The second-layer clips 44 are of the same material as that of the first-layer clips 41 and also have an outer shape similar to the first-layer clips 41. The second-layer clips 44 are of a cross-sectional size smaller than the first-layer clips 41 but can be positioned against and stacked under inside surfaces of the first-layer clips 41. The second-layer clips 44 have a width that is about half of the width of the first-layer clips 41, whereby the two pairs of the second-layer clips 44 can be positioned against outside surfaces of the two receptacles 43 at the opposite sides thereof so as to double the path through which the lines of magnetic force of the permanent magnets 421, 422 flow, allowing the lines of magnetic force to fast flow along the first-layer and second-layer clips 41, 44 and effectively improving the magnitude of the magnetic attraction and extending the time of use.

To assemble the first-layer and second-layer clips 41, 44, the receptacles 43, and the permanent magnets 421, 422 to the rectangular tubular body 311, the two second-layer clips 44 of each pair are positioned on the inside surfaces of each of the first-layer clips 41, and the permanent magnets 421, 422 are deposited into the two receptacles 43. Since the receptacles 43 are similarly made of soft iron materials, the permanent magnets 421, 422 can be attractively attached, through the receptacles 43, to the inside surfaces of the side walls 411 of one of the first-layer clips 41 with the receptacles 43 engaging and being held by the positioning bumps 412 of the side walls 411. Under this condition, one pair of second-layer clips 44 is located to position against outside surfaces of the receptacles 43.

Next, the two side walls 411 of the first-layer clip 41 are moved to be respectively positioned above and below the rectangular tubular body 311 to have the permanent magnets 421, 422 located adjacent to the outside surfaces 313 of the rectangular tubular body 311 in order to induce magnetic attraction to the rectangular tubular body 311. Afterwards, another first-layer clip 41 is positioned to have the side walls 411 thereof jointing to the side walls 411 of the previous first-layer clips 41 with the receptacles 43 engaging and supported by the positioning bumps 412 of said another first-layer clip 41 and the permanent magnets 421, 422 magnetically attracting and holding said another first-layer clip 41 and another pair of second-layer clips 44. In other words, each of the permanent magnets 42 is set between and magnetically attracts the positioning bumps 412 of the two first-layer clips 41 and between the two pairs of second-layer clips 44. Under this condition, the two first-layer clips 41 and the two pairs of second-layer clips 44 are positioned around and circumferentially enclose the outside circumference of the rectangular tubular body 311. It is noted that although two pairs of second-layer clips 44 are used as an example for illustrating the present invention, in practical applications, if the second-layer clips 44 are configured to have a width corresponding to that of the first-layer clips 41, then only two second-layer clips 44 are needed. When fuel flows through the fuel tube 31 and passes between the two permanent magnets 421, 422, the magnetism of the permanent magnets 421, 422 minimizes the cohesion force and adhesion force of water molecules, fuel molecules, and impurities contained in the fuel to a low extreme level and showing an ionized condition, to ensure continue and stable effectiveness of purification and combustion enhancement of fuel to eventually realize the goal of improving the mist condition of fuel for complete combustion. With the first-layer and second-layer clips 41, 44 being magnetically attracted and held together by the permanent magnets 421, 422 to form a circumferentially enclosing configuration, the lines of magnetic force of the permanent magnets 421, 422 can flow within and along the first-layer and second-layer clips 41, 44 without easy leakage, as shown in FIG. 15, so as to extend the time of use of magnetic forces. Further, with the multiple flow path arrangement for lines of magnetic force, the magnitudes of magnetic force and the penetration depth of magnetization can both be improved.

Figure 17:
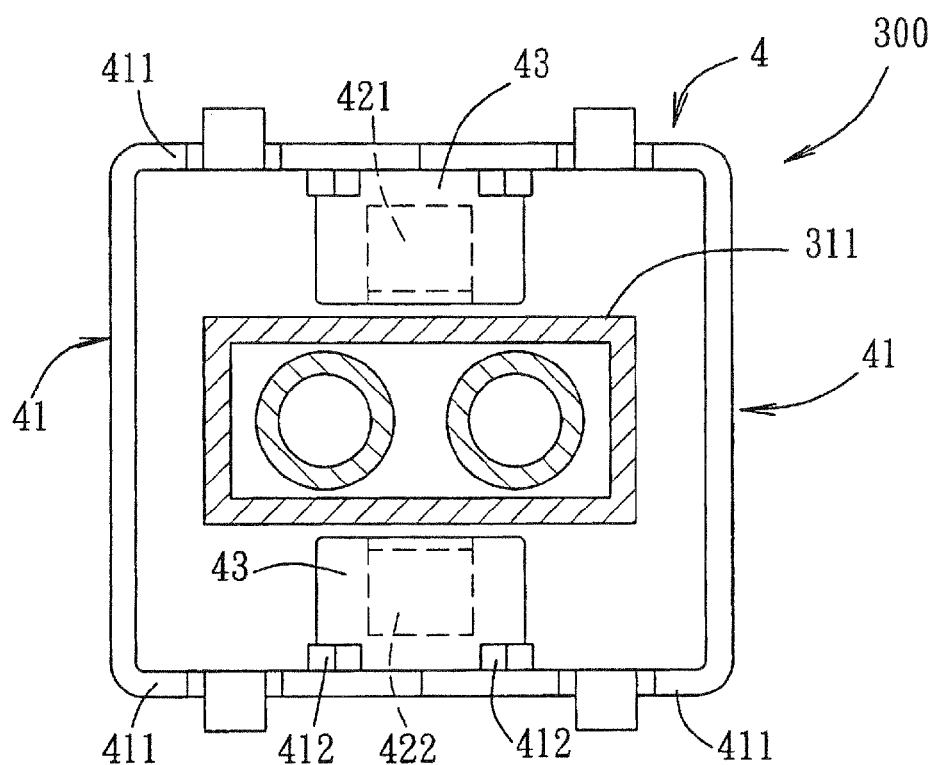
FIG. 17 is a cross-sectional view of the automobile fuel pretreatment device according to a modification of the first preferred embodiment of the present invention, illustrating the permanent magnets of the magnetization combustion-enhancing device and held in receptacles and retained through magnetic attraction on the first-layer clips at locations adjacent to the outside surfaces of the rectangular tubular body.
Figure 18:
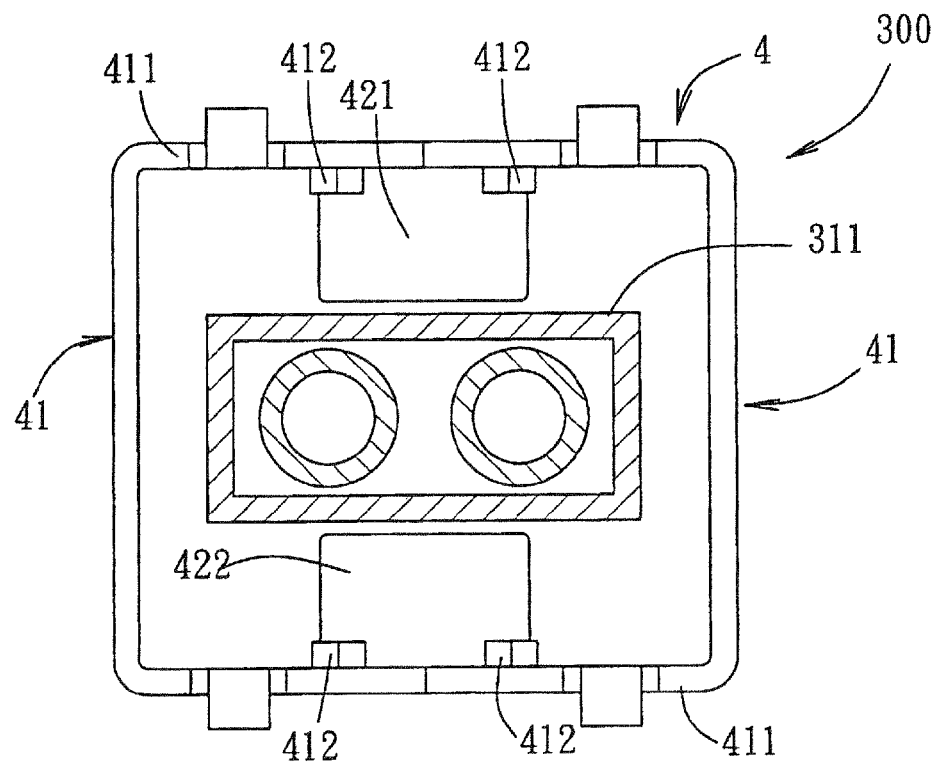
FIG. 18 is a cross-sectional view of the automobile fuel pretreatment device according to another modification of the first preferred embodiment of the present invention, illustrating the permanent magnets of the magnetization combustion-enhancing device engaging and supported by positioning bumps of the first-layer clips and retained through magnetic attraction on the first-layer clips at locations adjacent to the outside surfaces of the rectangular tubular body.

It is noted that an alternative feasible arrangement of the magnetization combustion-enhancing device 4, as shown in FIG. 17, comprises only the first-layer clips 41, but accomplishes the same effectiveness of enhancing the result of magnetization and extending the time of use. However, it is apparent that the multiple clip arrangement for flow path of lines of magnetic force is more effective in achieving the optimum result of magnetization and extension of time of use. Further, as shown in FIG. 18, the receptacles 43 can be omitted, but the size and shape of the permanent magnets 421, 422 must be made so as to resemble the receptacles 43 shown in FIG. 17, in order to have the permanent magnets 421, 422 engaging and supported between the positioning bumps 412 of the two first-layer clips 41 and the two permanent magnets 421, 422 be positioned, through magnetic attraction, on the inside surfaces of the first-layer clips 41 and located adjacent to the outside surfaces 31 of the rectangular tubular body 311.

As shown in FIGS. 6, 8, and 12, the instant embodiment uses a plurality of electric thermal ceramic elements 322 to heat the rectangular tubular body 311 of the fuel tube 31 and thus the fuel can be efficiently heated to a predetermined level of temperature. Also, the fuel tube 31 can be arranged in such a way that the rectangular tubular body 311 and the circular tubular sections 312, 312' collectively form a unique arrangement of Z-shaped path (as shown in FIG. 8). As such, the flow path of fuel is shortened, which help improving the efficiency of operation. The operation of the automobile fuel pretreatment device 300 will be described as follows.

When the automobile is turned on, through the pumping force generated by the gasoline pump, the fuel is driven to flow through an inlet opening 314 of one circular tubular section 312 and then ejects through an outlet opening 315 to impact a vertical wall 316 of the rectangular tubular body 311. The fuel, when flowing through the circular tubular section 312, is subjected to the magnetization induced by the permanent magnets 421, 422 of the magnetization combustion-enhancing device 4 to become ionized and absorb heat. When the fuel impacts the vertical wall 316, the fuel molecules are broken into minute particles of even smaller sizes, which start to turn and roll, causing the minute particles to carry negative electricity on a surface layer thereof but carrying positive electricity on a core thereof to realize ionization of even finer condition. The fuel then flows into a heating chamber 317 of the rectangular tubular body 311. With electric thermal ceramic elements 322 heating the rectangular tubular body 311, the ionized fuel molecules of minute particle sizes that are rotating and rolling and colliding each other are efficiently and uniformly absorbing thermal energy to realize a uniform result of heating. Afterwards, the fuel molecules of minute particle sizes flow through an inlet opening 314' into the fuel-draining circular tubular section 312' and are subjected to compression therein, whereby the uniformly heated fuel molecules are fast conducted through an outlet opening 315' to the carburetor. Since in the instant embodiment, a plurality of electric thermal ceramic elements 322 is used to heat the rectangular tubular body 311 of the fuel tube 31, in combination with the magnetization induced by the magnetization combustion-enhancing device 4 to minimize the cohesion force and the adhesion force of the water molecules, fuel molecules, and impurities contained in the fuel to a lower limit and in an ionized form, the fuel molecules of minute particle sizes contained in the fuel can be efficiently and uniformly heated to a predetermined temperature. As such, the optimum condition of mist can be realized and complete combustion can be done in a period of seven ten-thousandth seconds. It is further noted that fuel that flows through a conventional straightforward linear fuel tube is not broken, due to impact, into fuel particles of minute particle sizes for subsequent rotating and rolling, so that the result of heating on the molecules of the fuel is such that outside portions of the fuel are of high temperature, but the core portion is of low temperature, making it not possible to achieve instantaneous, simultaneous and uniform heating. Further, the dual Z-shaped path suggested in the prior art reference is incapable of providing a sufficient space for fuel impacting and rotating and rolling, so that it is of poor performance of heating. The fuel tube 31 according to the present invention adopts an arrangement of single Z-shape path, which when compared to the prior art, is capable of significantly improving heating performance and achieving instantaneous and uniform heating result.

Tests have been conducted for determining the effectiveness of the automobile fuel pretreatment device 300 according to the present invention, in which the automobile fuel pretreatment device 300 is installed on a passenger car of model CEFILO. Tests of exhaust gas are conducted at two different time points. Comparison of test results with stipulated standards indicates that the exhaust gas discharged from an automobile equipped with the automobile fuel pretreatment device 300 according to the present invention shows that the levels of discharged CO and HC are both lower than the stipulated requirements, and even approaching zero, and the level of discharged $CO_2$ is much higher than the stipulated standard. As such, an effect of reducing air pollution can be realized.

Figure 19:
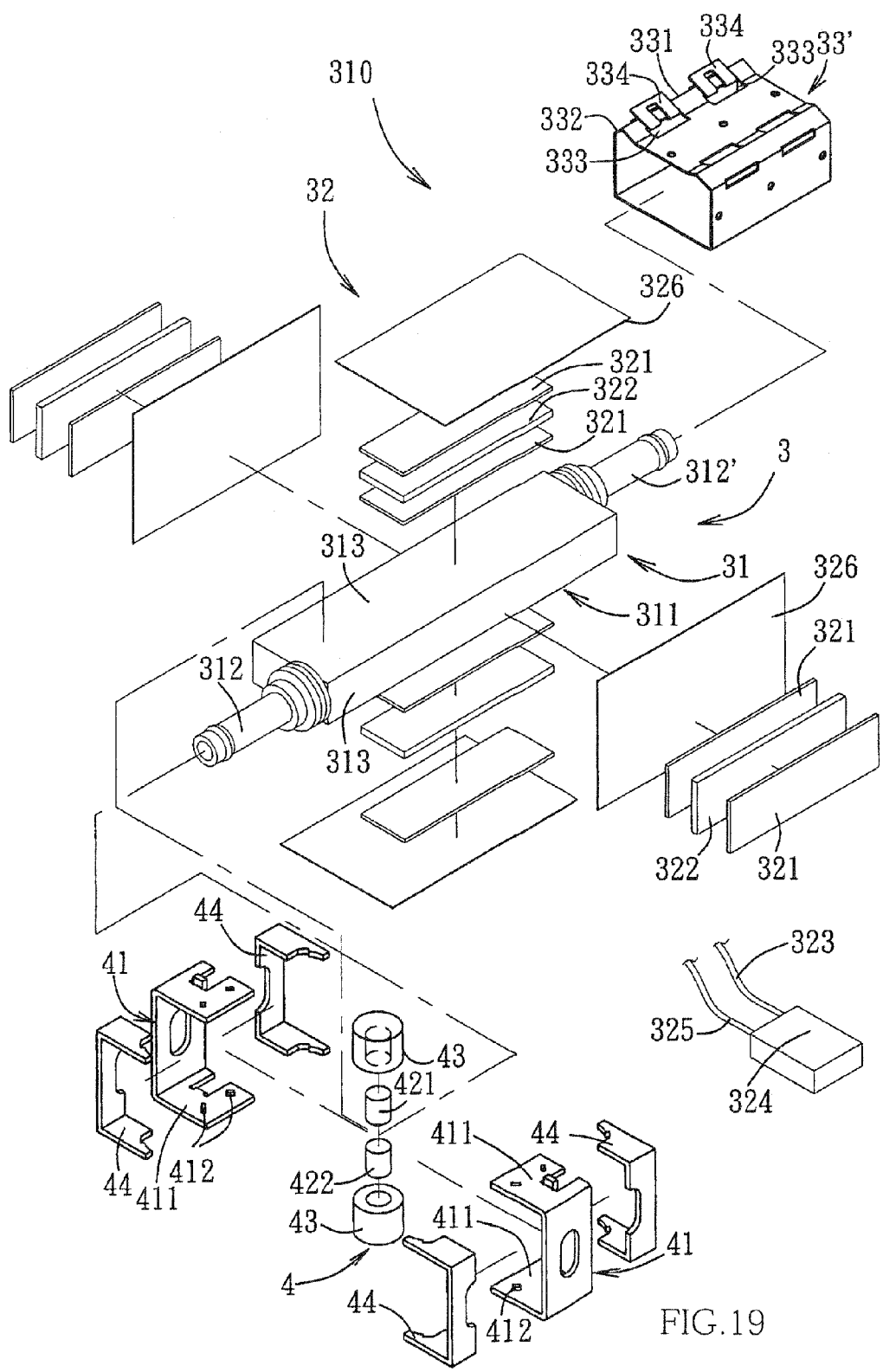
FIG. 19 is an exploded view showing an automobile fuel pretreatment device according to a second preferred embodiment of the present invention.
Figure 20:
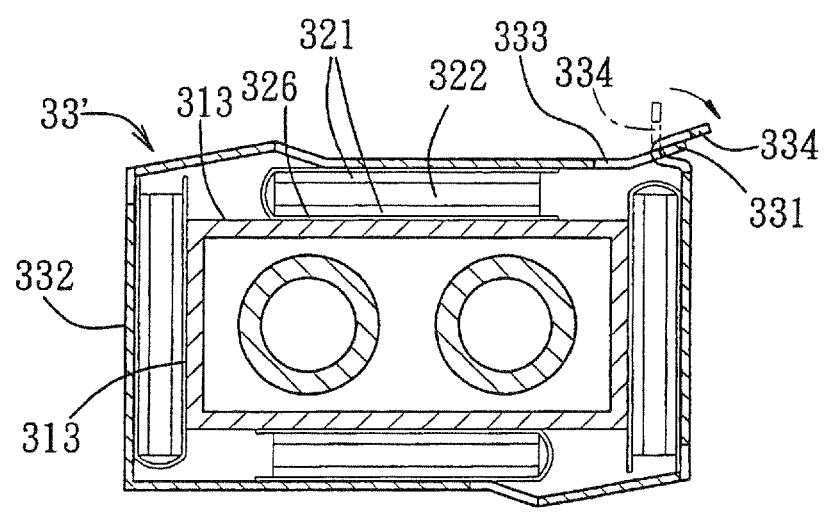
FIG. 20 is a cross-sectional view of the automobile fuel pretreatment device according to the second preferred embodiment of the present invention, illustrating a single spring clamp board enclosing and tightly clamping pairs of plate electrodes and electric thermal ceramic elements respectively wrapped by insulation sheets and positioned on the rectangular tubular body.

FIGS. 19 and 20 show an automobile fuel pretreatment device according to a second preferred embodiment of the present invention. The automobile fuel pretreatment device, which is generally designated at 310, is constructed and operated in substantially the same way as those of the first preferred embodiment described previously. A difference between the two embodiments resides in that the automobile fuel pretreatment device of the second embodiment comprises only one single spring clamp board 33', which is in the form of circumferentially-enclosing rectangular configuration, comprising an inclined first free end 331, a second free end 332, two locking holes 333 adjacent to the first free end 331, and two locking tabs 334 projecting from the second free end 332. The locking tabs 334 are respectively put into the locking holes 333 and are folded as indicated by the arrow of FIG. 20 so as to bend outward and engage the first free ends 331, whereby the spring clamp board 33' securely and tightly clamps and fixes the insulation sheets 326, the plate electrodes 321, and the electric thermal ceramic elements 322 on the outside surfaces 313 of the rectangular tubular body 311 of the fuel tube 31.

In summary, the automobile fuel pretreatment devices 300, 310 according to the two embodiments described above employ spring clamp boards 33, 330, 33' to securely and tightly clamp and fix the insulation assemblies formed of the insulation sheets 32 wrapping the plate electrodes 321 and the electric thermal ceramic elements 322 on the outside surfaces 313 of the rectangular tubular body 311 of the fuel tube 31, even under thermal expansion and cooling shrinkage. Further, a plurality of electric thermal ceramic elements 322 is adopted to heat the rectangular tubular body 311 of the fuel tube 31, so that excellent heating can be accomplished regardless of the amount of fuel supplied to efficiently heat the fuel to a desired temperature. The fuel tube 31 is arranged to form a single Z-shaped path so as to shorten the flow path of fuel and improve the efficiency of use. Further, the magnetization combustion-enhancing device 4 comprises two first-layer clips 41 that are attractively held together by the permanent magnets 421, 422 to form a circumferentially enclosing configuration and are used in combination with two receptacles 43 and two pairs of second-layer clips 44, whereby the lines of magnetic force of the permanent magnets 421, 422 are conduced to flow within and along the first-layer and second-layer clips 41, 44 without easy leakage so as to extend the time of use of the magnetic force and actually achieve the goals of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An automobile fuel pretreatment device, comprising:
    an instantaneous constant-temperature heating device, which comprises:
        a fuel tube which is adapted to allow fuel to flow therethrough,
        a heating unit, which comprises at least two plate electrodes arranged on an outside surface of the fuel tube, at least one electric thermal ceramic element interposed between the two plate electrodes, at least one insulation sheet wrapping around the two plate electrodes and the electric thermal ceramic element, and two power cables respectively supplying electrical current to the two plate electrodes, the two plate electrodes transmitting the electrical current to the electric thermal ceramic element for heating the fuel tube, and
        a spring clamp board, which circumferentially encloses and clamps an insulation assembly formed of the insulation sheet wrapping around the two plate electrodes and the electric thermal ceramic element on the fuel tube, the spring clamp board comprising a locking hole formed adjacent to a first free end and a locking tab formed adjacent to a second free end, the locking tab being received through the locking hole and folded back under plastic deformation to resiliently and overlappingly engage the first free end; and
    a magnetization combustion-enhancing device, which comprises at least one permanent magnet that is located adjacent to an outside surface of the fuel tube to induce magnetization on the fuel flowing through the fuel tube.

2. The automobile fuel pretreatment device according to claim 1, wherein the first free end of the spring clamp board is inclined.

3. The automobile fuel pretreatment device according to claim 1, wherein the heating unit comprises a plurality of pairs of plate electrodes arranged on the outside surface of the fuel tube, a plurality of electric thermal ceramic elements, and a plurality of insulation sheets, each of the electric thermal ceramic elements being interposed between plate electrodes of each of the plate electrode pairs, the two power cables supplying electrical current to each of the plate electrode pairs, each of the insulation sheets wrapping around each of the plate electrode pairs and each of the electric thermal ceramic elements, the spring clamp board enclosing and clamping the plate electrode pairs and the electric thermal ceramic elements that are wrapped by the insulation sheets on the fuel tube.

4. The automobile fuel pretreatment device according to claim 3, wherein the fuel tube comprises a rectangular tubular body and two circular tubular sections extending into and communicating the rectangular tubular body, the pairs of plate electrodes being respectively positioned on outside surfaces of the rectangular tubular body, the rectangular tubular body and the circular tubular sections collectively forming a single Z-shaped path.

5. The automobile fuel pretreatment device according to claim 4, wherein the magnetization combustion-enhancing device comprises two first-layer clips that are jointed to each other to circumferentially enclose an outside circumference of the rectangular tubular body and two permanent magnets, which are retained through magnetic attraction on inside surfaces of the two first-layer clips at locations adjacent to the outside surfaces of the rectangular tubular body.

6. The automobile fuel pretreatment device according to claim 5, wherein the two first-layer clips are of a U-shape comprising two spaced limbs connected by a connection and having free ends defining an opening, the two first-layer clips being arranged to have the openings facing each other and the free ends of the limbs of the U-shapes butting each other, the two permanent magnets being retained through magnetic attraction on the limbs of the U-shaped and positioned across the butting free ends of the limbs between the two first-layer clips, spaced positioning bumps being formed on the inside surfaces of each of the first-layer clips for engaging and supporting the permanent magnets.

7. The automobile fuel pretreatment device according to claim 5, wherein the two first-layer clips are of a U-shape comprising two spaced limbs connected by a connection and having free ends defining an opening, the two first-layer clips being arranged to have the openings facing each other and the free ends of the limbs of the U-shapes butting each other, the magnetization combustion-enhancing device comprising two receptacles having a bowl-shape and forming openings facing each other for receiving and holding the two permanent magnets therein, spaced positioning bumps being formed on inside surfaces of the limbs of the first-layer clips for engaging and holding the receptacles therebetween when the free ends of the limbs butt each other, the two permanent magnets being retained through magnetic attraction on the limbs of the U-shaped and positioned across the butting free ends of the limbs between the two first-layer clips with the two receptacles.

8. The automobile fuel pretreatment device according to claim 7, wherein the magnetization combustion-enhancing device further comprises two second-layer clips positioned against inside surfaces of the two first-layer clips, the two second-layer clips being of a U-shape and engaging outside surfaces of the two receptacles.

9. The automobile fuel pretreatment device according to claim 5, wherein the two first-layer clips are of a U-shape comprising two spaced limbs connected by a connection and having free ends defining an opening, the two first-layer clips being arranged to have the openings facing each other and the free ends of the limbs of the U-shapes butting each other, the magnetization combustion-enhancing device comprising two receptacles having a bowl-shape and forming openings facing each other for receiving and holding the two permanent magnets therein, spaced positioning bumps being formed on inside surfaces of the limbs of the first-layer clips for engaging and holding the receptacles therebetween when the free ends of the limbs butt each other, the two permanent magnets being retained through magnetic attraction on the limbs of the U-shaped and positioned across the butting free ends of the limbs between the two first-layer clips with the two receptacles.

10. The automobile fuel pretreatment device according to claim 9, wherein the magnetization combustion-enhancing device further comprises two second-layer clips positioned against inside surfaces of the two first-layer clips, the two second-layer clips being of a U-shape and engaging outside surfaces of the two receptacles.

11. The automobile fuel pretreatment device according to claim 1, wherein the magnetization combustion-enhancing device comprises two first-layer clips that are jointed to each other to circumferentially enclose an outside circumference of the fuel tube and two permanent magnets, which are retained through magnetic attraction on inside surfaces of the two first-layer clips at locations adjacent to the outside surface of the fuel tube.

12. The automobile fuel pretreatment device according to claim 11, wherein the two first-layer clips are of a U-shape comprising two spaced limbs connected by a connection and having free ends defining an opening, the two first-layer clips being arranged to have the openings facing each other and the free ends of the limbs of the U-shapes butting each other, the two permanent magnets being retained through magnetic attraction on the limbs of the U-shaped and positioned across the butting free ends of the limbs between the two first-layer clips, spaced positioning bumps being formed on the inside surfaces of each of the first-layer clips for engaging and supporting the permanent magnets.

13. The automobile fuel pretreatment device according to claim 11, wherein the two first-layer clips are of a U-shape comprising two spaced limbs connected by a connection and having free ends defining an opening, the two first-layer clips being arranged to have the openings facing each other and the free ends of the limbs of the U-shapes butting each other, the magnetization combustion-enhancing device comprising two receptacles having a bowl-shape and forming openings facing each other for receiving and holding the two permanent magnets therein, spaced positioning bumps being formed on inside surfaces of the limbs of the first-layer clips for engaging and holding the receptacles therebetween when the free ends of the limbs butt each other, the two permanent magnets being retained through magnetic attraction on the limbs of the U-shaped and positioned across the butting free ends of the limbs between the two first-layer clips with the two receptacles.

14. The automobile fuel pretreatment device according to claim 13, wherein the magnetization combustion-enhancing device further comprises two second-layer clips positioned against inside surfaces of the two first-layer clips, the two second-layer clips being of a U-shape and engaging outside surfaces of the two receptacles.

15. An automobile fuel pretreatment device, comprising:
an instantaneous constant-temperature heating device, which comprises:
a fuel tube which is adapted to allow fuel to flow therethrough,
a heating unit, which comprises at least two plate electrodes arranged on an outside surface of the fuel tube, at least one electric thermal ceramic element interposed between the two plate electrodes, at least one insulation sheet wrapping around the two plate electrodes and the electric thermal ceramic element, and two power cables respectively supplying electrical current to the two plate electrodes, the two plate electrodes transmitting the electrical current to the electric thermal ceramic element for heating the fuel tube, and
two spring clamp boards, which enclose and clamp an insulation assembly formed of the insulation sheet wrapping around the two plate electrodes and the electric thermal ceramic element on the fuel tube, each of the spring clamp boards comprising a locking hole formed adjacent to a first free end and a locking tab formed adjacent to a second free end, the locking tab of each of the spring clamp boards being received through the locking hole of the other one of the spring clamp boards and folded back under plastic deformation to resiliently and overlappingly engage the first free end of said the other one of the spring clamp boards; and a magnetization combustion-enhancing device, which comprises at least one permanent magnet that is located adjacent to an outside surface of the fuel tube to induce magnetization on the fuel flowing through the fuel tube.

16. The automobile fuel pretreatment device according to claim 15, wherein the first free end of each of the spring clamp boards is inclined.

17. The automobile fuel pretreatment device according to claim 15, wherein the heating unit comprises a plurality of pairs of plate electrodes arranged on the outside surface of the fuel tube, a plurality of electric thermal ceramic elements, and a plurality of insulation sheets, each of the electric thermal ceramic elements being interposed between plate electrodes of each of the plate electrode pairs, the two power cables supplying electrical current to each of the plate electrode pairs, each of the insulation sheets wrapping around each of the plate electrode pairs and each of the electric thermal ceramic elements, the two spring clamp boards enclosing and clamping the plate electrode pairs and the electric thermal ceramic elements that are wrapped by the insulation sheets on the fuel tube.

18. The automobile fuel pretreatment device according to claim 17, wherein the fuel tube comprises a rectangular tubular body and two circular tubular sections extending into and communicating the rectangular tubular body, the pairs of plate electrodes being respectively positioned on outside surfaces of the rectangular tubular body, the rectangular tubular body and the circular tubular sections collectively forming a single Z-shaped path.

19. The automobile fuel pretreatment device according to claim 18, wherein the magnetization combustion-enhancing device comprises two first-layer clips that are jointed to each other to circumferentially enclose an outside circumference of the rectangular tubular body and two permanent magnets, which are retained through magnetic attraction on inside surfaces of the two first-layer clips at locations adjacent to the outside surfaces of the rectangular tubular body.

20. The automobile fuel pretreatment device according to claim 19, wherein the two first-layer clips are of a U-shape comprising two spaced limbs connected by a connection and having free ends defining an opening, the two first-layer clips being arranged to have the openings facing each other and the free ends of the limbs of the U-shapes butting each other, the two permanent magnets being retained through magnetic attraction on the limbs of the U-shaped and positioned across the butting free ends of the limbs between the two first-layer clips, spaced positioning bumps being formed on the inside surfaces of each of the first-layer clips for engaging and supporting the permanent magnets.

21. The automobile fuel pretreatment device according to claim 15, wherein the magnetization combustion-enhancing device comprises two first-layer clips that are jointed to each other to circumferentially enclose an outside circumference of the fuel tube and two permanent magnets, which are retained through magnetic attraction on inside surfaces of the two first-layer clips at locations adjacent to the outside surface of the fuel tube.

22. The automobile fuel pretreatment device according to claim 21, wherein the two first-layer clips are of a U-shape comprising two spaced limbs connected by a connection and having free ends defining an opening, the two first-layer clips being arranged to have the openings facing each other and the free ends of the limbs of the U-shapes butting each other, the two permanent magnets being retained through magnetic attraction on the limbs of the U-shaped and positioned across the butting free ends of the limbs between the two first-layer clips, spaced positioning bumps being formed on the inside surfaces of each of the first-layer clips for engaging and supporting the permanent magnets.

23. The automobile fuel pretreatment device according to claim 21, wherein the two first-layer clips are of a U-shape comprising two spaced limbs connected by a connection and having free ends defining an opening, the two first-layer clips being arranged to have the openings facing each other and the free ends of the limbs of the U-shapes butting each other, the magnetization combustion-enhancing device comprising two receptacles having a bowl-shape and forming openings facing each other for receiving and holding the two permanent magnets therein, spaced positioning bumps being formed on inside surfaces of the limbs of the first-layer clips for engaging and holding the receptacles therebetween when the free ends of the limbs butt each other, the two permanent magnets being retained through magnetic attraction on the limbs of the U-shaped and positioned across the butting free ends of the limbs between the two first-layer clips with the two receptacles.

24. The automobile fuel pretreatment device according to claim 23, wherein the magnetization combustion-enhancing device further comprises two second-layer clips positioned against inside surfaces of the two first-layer clips, the two second-layer clips being of a U-shape and engaging outside surfaces of the two receptacles.

* * * * *